(12) United States Patent
Furuta et al.

(10) Patent No.: US 12,338,634 B2
(45) Date of Patent: Jun. 24, 2025

(54) TRANSPARENT RESIN FILM, DECORATIVE BOARD, AND METHOD FOR PRODUCING DECORATIVE BOARD

(71) Applicant: Dai Nippon Printing Co., Ltd., Tokyo (JP)

(72) Inventors: Satoshi Furuta, Tokyo (JP); Ryo Fujii, Tokyo (JP); Tomomi Nakajima, Tokyo (JP); Yoshiaki Netsu, Tokyo (JP); Toshinaru Kayahara, Tokyo (JP); Yosuke Sumida, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 17/283,679

(22) PCT Filed: Sep. 30, 2019

(86) PCT No.: PCT/JP2019/038603
§ 371 (c)(1),
(2) Date: Apr. 8, 2021

(87) PCT Pub. No.: WO2020/075563
PCT Pub. Date: Apr. 16, 2020

(65) Prior Publication Data
US 2021/0381248 A1    Dec. 9, 2021

(30) Foreign Application Priority Data
Oct. 12, 2018    (JP) .................................. 2018-193827

(51) Int. Cl.
*E04F 13/08*        (2006.01)
*B32B 3/30*         (2006.01)
(Continued)

(52) U.S. Cl.
CPC ............ *E04F 13/0871* (2013.01); *B32B 3/30* (2013.01); *B32B 7/12* (2013.01); *B32B 21/08* (2013.01);
(Continued)

(58) Field of Classification Search
CPC ..... B32B 3/30; B32B 21/08; B32B 2307/412; B32B 2451/00; B32B 3/28; E04F 13/0871; E04F 13/0866
See application file for complete search history.

(56) References Cited

U.S. PATENT DOCUMENTS

2016/0200082 A1    7/2016  Awa et al.
2016/0325535 A1*  11/2016  Ueno ....................... B32B 27/36
2020/0061885 A1    2/2020  Fujii et al.

FOREIGN PATENT DOCUMENTS

JP    H11-245337 A    9/1999
JP    2002-337291 A   11/2002
(Continued)

OTHER PUBLICATIONS

Translation of JP2003340973A (bib, claims and description). (Year: 2003).*
(Continued)

*Primary Examiner* — Catherine A. Simone
(74) *Attorney, Agent, or Firm* — Troutman Pepper Locke LLP

(57) ABSTRACT

The present invention provides a transparent resin film excellent in weather resistance even in a case where a pattern of protrusions and depressions is formed on the surface for the purpose of imparting excellent design properties, a decorative board including the transparent resin film, and a method for producing the decorative board. Provided is a transparent resin film for protecting a picture layer on one side of a substrate, including at least: a surface protective
(Continued)

layer; and a transparent resin layer, laminated on each other, the transparent resin film having a pattern of protrusions and depressions on a surface protective layer side, the transparent resin film having a thickness at a depression of the pattern of protrusions and depressions of 100 μm or larger, the transparent resin film containing an ultraviolet absorber.

8 Claims, 1 Drawing Sheet

(51) Int. Cl.
B32B 7/12 (2006.01)
B32B 21/08 (2006.01)
B44C 5/04 (2006.01)
(52) U.S. Cl.
CPC ........ *B44C 5/0469* (2013.01); *E04F 13/0866* (2013.01); *B32B 2250/02* (2013.01); *B32B 2307/412* (2013.01); *B32B 2307/71* (2013.01); *B32B 2307/732* (2013.01); *B32B 2451/00* (2013.01)

(56) References Cited

FOREIGN PATENT DOCUMENTS

| JP | 2003-291254 A | | 10/2003 |
|----|---------------|---|---------|
| JP | 2003340973 A | * | 12/2003 |
| JP | 2005103847 A | * | 4/2005 |
| JP | 2005-120255 A | | 5/2005 |
| JP | 2009184167 A | * | 8/2009 |
| JP | 2011-073146 A | | 4/2011 |
| JP | 2014069507 A | * | 4/2014 |
| JP | 2017-141665 A | | 8/2017 |
| KR | 2009-0091188 A | | 8/2009 |
| WO | 2015/046568 A1 | | 4/2015 |
| WO | 2018/181775 A1 | | 10/2018 |

OTHER PUBLICATIONS

Translation of JP2005103847A. (bib, description and claims). (Year: 2005).*
Translation of JP2009184167A (bib and description). (Year: 2009).*
Translation of JP2014069507A (abstract, description and claims). (Year: 2014).*

* cited by examiner

Thickness at depression of pattern of protrusions and depressions

Total thickness

TRANSPARENT RESIN FILM, DECORATIVE BOARD, AND METHOD FOR PRODUCING DECORATIVE BOARD

CROSS REFERENCE TO RELATED APPLICATIONS

This application is related to three co-pending applications: "DECORATIVE BOARD, TRANSPARENT RESIN FILM, AND DECORATIVE BOARD PRODUCTION METHOD" filed even date herewith in the names of Satoshi Furuta, Ryo Fujii, Tomomi Nakajima, Yoshiaki Netsu, Toshinaru Kayahara and Yosuke Sumida as a national phase entry of PCT/JP2019/038597; "TRANSPARENT RESIN FILM, DECORATIVE BOARD, AND METHOD FOR PRODUCING DECORATIVE BOARD" filed even date herewith in the names of Ryo Fujii, Satoshi Furuta, Tomomi Nakajima, Yoshiaki Netsu, Toshinaru Kayahara and Yosuke Sumida as a national phase entry of PCT/JP2019/038606; and "TRANSPARENT RESIN FILM, DECORATIVE BOARD, AND METHOD FOR PRODUCING DECORATIVE BOARD" filed even date herewith in the names of Satoshi Furuta, Ryo Fujii, Tomomi Nakajima, Yoshiaki Netsu, Toshinaru Kayahara and Yosuke Sumida as a national phase entry of PCT/JP2019/038611; which applications are assigned to the assignee of the present application and all three incorporated by reference herein.

TECHNICAL FIELD

The present invention relates to a transparent resin film, a decorative board including the transparent resin film, and a method for producing the decorative board.

BACKGROUND ART

A recent spread of ink-jet printing methods using inkjet printers has enabled production of decorative boards used for applications such as building materials or decorative molded articles of many kinds in small quantities and printing of complicated patterns (e.g., letters, numbers, and graphics) as picture layers.

The ink-jet printing methods advantageously enable printing not only on film substrates but also on substrates having flat surfaces, projections and depressions, and curved surfaces.

Since a picture layer prepared by an ink-jet printing method is typically provided on the outermost surface of the substrate, a transparent resin film is necessarily provided on a surface of the picture layer for the purpose of protecting the picture layer having insufficient surface properties such as scratch resistance, stain resistance, and weather resistance.

As such a transparent resin film, Patent Literature 1 discloses an overlaminate film including: a transparent polypropylene film containing a triazine ultraviolet absorber and a hindered amine light stabilizer; a protective layer on one side of the film; and an adhesive layer on the other side of the film.

A conventional transparent resin film can have better design properties when the transparent resin film has a pattern of protrusions and depressions. However, the presence of the pattern of protrusions and depressions causes variations in thickness, resulting in variations in weather resistance. In particular, the weather resistance may be poor at a thin part, which leaves room for improvement.

Such a tendency is remarkable particularly for picture layers prepared by ink-jet printing methods in which a wide variety of ink is used.

CITATION LIST

Patent Literature

Patent Literature 1: JP 2005-120255 A

SUMMARY OF INVENTION

Technical Problem

The present invention aims to provide a transparent resin film capable of exhibiting excellent weather resistance even in a depression of a pattern of protrusions and depressions even in a case where the pattern of protrusions and depressions is formed on the surface for the purpose of providing excellent design properties, a decorative board including the transparent resin film, and a method for producing the decorative board.

Solution to Problem

The present inventors made intensive studies to solve the above problem, and found out that a transparent resin film excellent in weather resistance even in the case where a pattern of protrusions and depressions is formed on the surface for the purpose of providing excellent design properties can be provided when the transparent resin film has a pattern of protrusions and depressions on a surface on the opposite side to the picture layer side, the transparent resin film has a predetermined thickness at a depression of the pattern of protrusions and depressions pattern of protrusions and depressions, and the transparent resin film contains an ultraviolet absorber. Thus, the present invention was completed.

The present invention relates to a transparent resin film for protecting a picture layer on one side of a substrate, including at least: a surface protective layer; and a transparent resin layer, laminated on each other, the transparent resin film having a pattern of protrusions and depressions on a surface protective layer side, the transparent resin film having a thickness at a depression of the pattern of protrusions and depressions of 100 μm or larger, the transparent resin film containing an ultraviolet absorber.

In the transparent resin film of the present invention, the ultraviolet absorber is preferably contained in at least one of the surface protective layer or the transparent resin layer.

The transparent resin film of the present invention preferably includes an adhesion primer layer on a side opposite to the surface protective layer side of the transparent resin layer.

The adhesion primer layer preferably has a thickness of 0.5 μm or larger and 10 μm or smaller.

The ultraviolet absorber is preferably a triazine ultraviolet absorber.

The present invention also relates to a decorative board including: a substrate; a picture layer; and the transparent resin film of the present invention, in a stated order in a thickness direction.

The decorative board of the present invention preferably includes an adhesive layer between the picture layer on one side of the substrate and the transparent resin film.

The present invention also relates to a method for producing the decorative board of the present invention, the method including: forming an adhesive layer on a picture layer side of a transparent resin film; and bonding the transparent resin film and the picture layer with the adhesive layer.

Advantageous Effects of Invention

The present invention can provide a transparent resin film that is capable of imparting excellent design properties to a decorative board and is excellent in weather resistance.

The decorative board of the present invention including the transparent resin film of the present invention has excellent design properties and is excellent in weather resistance.

DESCRIPTION OF EMBODIMENTS

A description is given on the transparent resin film of the present invention hereinbelow.

The transparent resin film of the present invention at least includes a surface protective layer and a transparent resin layer laminated on each other, and has a pattern of protrusions and depressions on a surface protective layer side. The thickness at a depression of the pattern of protrusions and depressions is a predetermined thickness or larger. The transparent resin film contains an ultraviolet absorber.

A conventional transparent resin film having a pattern of protrusions and depressions has thickness variations, and contains a smaller amount of an ultraviolet absorber at a thin part (at a depression of the pattern of protrusions and depressions), failing to have sufficient weather resistance.

In contrast, the transparent resin film of the present invention surely has a sufficient thickness at a depression of the pattern of protrusions and depressions and contains an ultraviolet absorber even at the depression of the pattern of protrusions and depressions, and therefore has sufficient weather resistance even at a thin part formed by the pattern of protrusions and depressions.

The phrase "contains an ultraviolet absorber even at the depression of the pattern of protrusions and depressions" herein refers to the presence of an ultraviolet absorber between the bottom of the depression of the pattern of protrusions and depressions and the surface on the opposite side to the surface protective layer side of the transparent resin film of the present invention in a cross-sectional view. Specifically, whether or not an ultraviolet absorber is contained at a depression of the pattern of protrusions and depressions can be determined as follows. A specimen having an area of 10 $cm^2$ including a depression of the pattern of protrusions and depressions is cut out from the surface protective layer side surface of the transparent resin film of the present invention. The specimen is shattered using a freezer mill, and the ultraviolet absorber is extracted using tetrahydrofuran (THF). The ultraviolet absorber diluted with methanol, acetone, or IPA is subjected to measurement by liquid chromatography.

A preferred example of the transparent resin film of the present invention is described with reference to FIG. 1.

Figure 1:
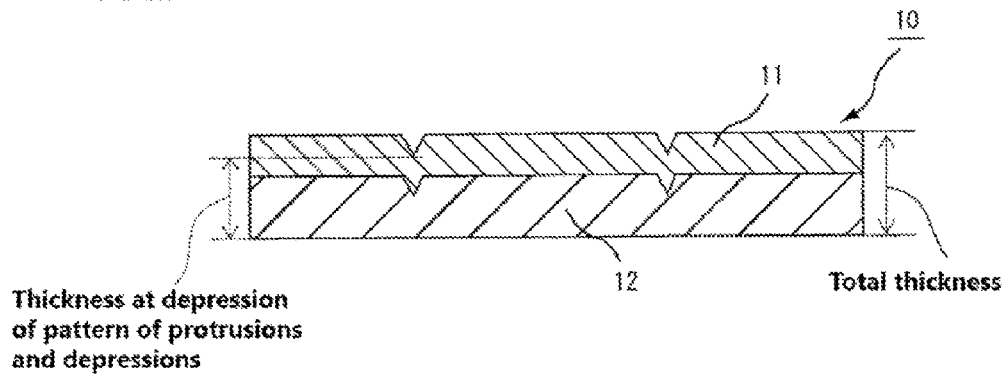
FIG. 1 is a schematic view illustrating a cross section of an example of the transparent resin film of the present invention.

As illustrated in FIG. 1, a transparent resin film 10 of the present invention includes a transparent resin layer 12 and a surface protective layer on one side of the transparent resin layer 12, and has a pattern of protrusions and depressions on the surface protective layer 11 side.

The transparent resin film 10 of the present invention including the surface protective layer 11 has better durability (e.g., scratch resistance, contamination resistance, weather resistance) to favorably prevent impairment of the design properties due to damage thereon.

Figure 2:
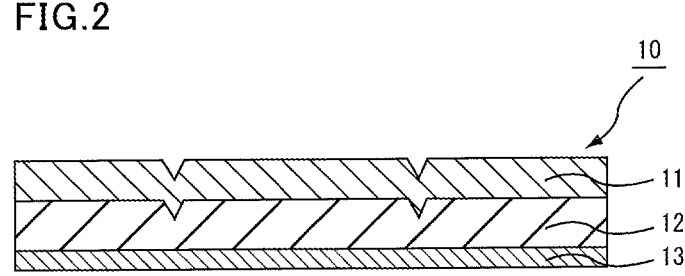
FIG. 2 is a schematic view illustrating a cross section of a preferred example of the transparent resin film of the present invention.

As illustrated in FIG. 2, the transparent resin film 10 of the present invention preferably includes an adhesion primer layer 13 on the surface on the opposite side to the surface protective layer 11 side of the transparent resin layer 12.

From the standpoint of increasing the adhesion strength between the transparent resin layer 12 and the surface protective layer 11, the transparent resin film 10 of the present invention preferably includes a primer (not illustrated) between the transparent resin layer 12 and the surface protective layer 11.

Hereinbelow, the components of the transparent resin film of the present invention are described.

The transparent resin layer is a layer for protecting a picture layer on one side of a substrate described later. The transparent resin layer may be translucent or colored as long as the layer is clear enough to visually recognize a picture layer described later.

The transparent resin layer contains one or more of the following resins, and is preferably formed of a thermoplastic resin. Examples of the thermoplastic resin include: olefin resins such as polyethylene, polypropylene, polybutene, polymethylpentene, and olefin-based thermoplastic elastomers; polyester resins such as polyethylene terephthalate, polybutylene terephthalate, polyethylene naphthalate, ethylene glycol-terephthalic acid-isophthalic acid copolymers, terephthalic acid-ethylene glycol-1,4-cyclohexane dimethanol copolymers, and polyester-based thermoplastic elastomers; acrylic resins such as polymethyl(meth)acrylate, methyl(meth)acrylate-butyl(meth)acrylate copolymers, and methyl(meth)acrylate-styrene copolymers; polycarbonate resins; polyvinyl chloride; polystyrene; and ionomers. In particular, polypropylene is favorably used as it has high tensile strength and is excellent in chemical resistance to be advantageous in the production process.

The term "(meth)acrylate" as used herein refers to acrylate or methacrylate.

The transparent resin layer may be unstretched or uniaxially or biaxially stretched, if needed.

The transparent resin layer may have any thickness. The lower limit of the thickness is preferably 20 μm and the upper limit thereof is preferably 500 μm or smaller. The lower limit is more preferably 60 μm and the upper limit is more preferably 420 μm or smaller. When the transparent resin layer has a thickness of smaller than 20 μm, the thermoplastic resin layer may have insufficient tensile strength, failing to protect the surface of the picture layer. When the thermoplastic resin layer has a thickness of larger than 500 μm, the transparent resin film of the present invention may have a lower transmittance, resulting in lower visibility of the picture of the picture layer.

The transparent resin layer may have a single-layer structure or a laminated structure including two or more layers.

In the case where the transparent resin layer is a laminate including multiple layers, the types of the resins forming the multiple layers of the laminate may be the same or different, and the thicknesses of the multiple resin layers may be the same or different.

Two or more transparent resin layers may be laminated by any common method. Examples of the method include dry lamination and extrusion thermal lamination.

Having the surface protective layer, the transparent resin film of the present invention has higher durability (e.g., scratch resistance, contamination resistance, weather resistance) to be able to more favorably protect the surface of the picture layer, favorably preventing impairment of the design properties due to damage on the transparent resin film itself of the present invention.

The surface protective layer may have a single-layer structure or a multilayer structure including multiple layers formed of the same or different material(s). The following materials may be appropriately mixed to form the surface protective layer.

Any surface protective layer may be used. Examples thereof include those formed of a crosslink-cured product of a two-component curable resin or ionizing radiation-curable resin composition. The crosslink-cured product is preferably clear, and may be translucent or colored as long as the layer is clear enough to visually recognize the picture layer described later.

The two-component curable resin may be, for example, a binder resin of an adhesion primer layer described later.

The ionizing radiation-curable resin is preferably, for example, an oligomer (including what we call a prepolymer and a macromonomer) having a radical polymerizable unsaturated bond or a cationic polymerizable functional group in the molecule and/or a monomer having a radical polymerizable unsaturated bond or a cationic polymerizable functional group in the molecule. The term "ionizing radiation" herein refers to an electromagnetic wave or charged particle having energy capable of polymerizing or crosslinking molecules. The ionizing radiation is typically an electron beam (EB) or ultraviolet light (UV).

Examples of the oligomer or monomer include compounds having a radical polymerizable unsaturated group (e.g., a (meth)acryloyl group, a (meth)acryloyloxy group) or a cationic polymerizable functional group (e.g., an epoxy group) in the molecule. Each of these oligomers or monomers may be used alone, or two or more thereof may be used in admixture. The term "(meth)acryloyl group" as used herein refers to an acryloyl group or a methacryloyl group.

The oligomer having a radical polymerizable unsaturated group in the molecule is preferably, for example, an oligomer of urethane (meth)acrylate, polyester (meth)acrylate, epoxy (meth)acrylate, melamine (meth)acrylate, or triazine (meth)acrylate, more preferably a urethane (meth)acrylate oligomer. An oligomer having a molecular weight of about 250 to 100000 is typically used.

The monomer having a radical polymerizable unsaturated group in the molecule is preferably, for example, a polyfunctional monomer, more preferably a polyfunctional (meth) acrylate.

Examples of the polyfunctional (meth)acrylate include diethylene glycol di(meth)acrylate, propylene glycol di(meth)acrylate, bisphenol A ethylene oxide-modified di(meth) acrylate, trimethyrolpropane tri(meth)acrylate, trimethylolpropane ethylene oxide tri(meth)acrylate, dipentaerythritol tetra(meth)acrylate, dipentaerythritol penta(meth)acrylate (pentafunctional (meth)acrylate), dipentaerythritol hexa(meth)acrylate (hexafunctional (meth)acrylate). The term "polyfunctional monomer" herein refers to a monomer having multiple radical polymerizable unsaturated groups.

In the present invention, the ionizing radiation-curable resin composition preferably further contains an ionizing radiation-curable resin component containing a urethane acrylate oligomer and a polyfunctional monomer. The ionizing radiation-curable resin component particularly preferably contains a urethane acrylate oligomer and a polyfunctional monomer at a mass ratio (urethane acrylate oligomer/polyfunctional monomer) of 6/4 to 9/1. Within such a mass ratio range, better scratch resistance can be achieved.

If needed, a monofunctional monomer may be appropriately used in addition to the ionizing radiation-curable resin component within a range of the gist of the present invention.

Examples of the monofunctional monomer include methyl(meth)acrylate, 2-ethylhexyl(meth)acrylate, phenoxyethyl (meth)acrylate.

In the case where ultraviolet light is used for crosslinking of the ionizing radiation-curable resin composition, a photopolymerization initiator is preferably added to the ionizing radiation-curable resin composition.

In the case where the ionizing radiation-curable resin composition is a resin system containing a radical polymerizable unsaturated group, the photopolymerization initiator used may be an acetophenone, a benzophenone, a thioxanthone, benzoin, a benzoin methyl ether, or a mixture of these.

In the case where the ionizing radiation-curable resin composition is a resin system containing a cationic polymerizable unsaturated group, the photopolymerization initiator used may be an aromatic diazonium salt, an aromatic sulfonium salt, an aromatic iodonium salt, a metallocene compound, a benzoin sulfonic acid ester, or a mixture of these. The amount of the photopolymerization initiator is about 0.1 to 10 parts by mass per 100 parts by mass of the ionizing radiation-curable resin component.

The ionizing radiation-curable resin composition may further contain additives, if needed. Examples of the additives include thermoplastic resins (e.g., urethane resins, polyvinyl acetal resins, polyester resins, polyolefin resins, styrene resins, polyamide resins, polycarbonate resins, acetal resins, vinyl chloride-vinyl acetate copolymers, vinyl acetate resins, acrylic resins, cellulose resins), lubricants (e.g., silicone resins, wax, fluororesins), ultraviolet absorbers (e.g., benzotriazole, benzophenone, triazine), light stabilizers (e.g., hindered amine radical scavengers), and colorants (e.g., dyes, pigments).

The electron beam source for the ionizing radiation used may be, for example, an electron beam accelerator of any type (Cockcroft-Walton type, Van de Graaff type, resonant transformer type, insulating core transformer type, linear type, Dynamitron type, radio frequency type) capable of delivering electrons having an energy of 70 to 1000 keV. The electron beam dose is preferably, for example, about 1 to 10 Mrad.

The UV source for the ionizing radiation may be, for example, a light source such as an ultra-high pressure mercury lamp, a high-pressure mercury lamp, a low-pressure mercury lamp, a carbon-arc lamp, a black light, or a metal halide lamp. The ultraviolet light used typically has a wavelength within a range of 190 to 380 nm.

The surface protective layer may have any thickness. The lower limit of the thickness is preferably 0.1 µm and the upper limit thereof is preferably 50 µm. The lower limit is more preferably 1 µm and the upper limit is more preferably 30 µm. When the surface protective layer has a thickness of smaller than 0.1 μm, sufficient durability (e.g., scratch resistance, contamination resistance, weather resistance) may not be imparted. When the surface protective layer has a thickness of larger than 50 μm, the transparent resin film of the present invention may have a lower transmittance, resulting in lower visibility of the picture of the picture layer.

The surface protective layer is a layer on the surface of the transparent resin layer on the opposite side to the surface where a picture layer described later is laminated, and is preferably bonded to the transparent resin layer with a primer. The primer can increase the adhesion strength between the surface protective layer and the transparent resin layer.

The primer used is preferably similar to one used in an adhesion primer layer described later.

The transparent resin film of the present invention has a pattern of protrusions and depressions on the surface protective layer side.

The pattern of protrusions and depressions may be formed by any method. Examples of the method include thermal embossing and transferring of a pattern of protrusions and depressions using a shape-forming sheet.

Thermal embossing may be performed, for example, using a known sheet- or rotary embosser.

Examples of an embossed pattern include a grain pattern, a hairline pattern, a satin pattern, a wood-grain vessel pattern, a pattern of protrusions and depressions of slab surfaces, a fabric surface texture, and a linear streak pattern.

The embossing may be performed at any temperature, preferably at a temperature that reduces a loss of the pattern or protrusions and depressions, i.e., an embossing return, during molding by thermal press bonding.

The pattern of protrusions and depressions to be formed may have any depth. The depth is preferably adjusted as appropriate, for example, in a manner that the center line average roughness Ra defined in JIS B 0601 (1982) is within a range of 1 to 30 μm.

The transparent resin film of the present invention may have any thickness. However, the thickness at a depression of the pattern of protrusions and depressions should be 100 μm or larger. When the transparent resin film has a thickness at a depression of the pattern of protrusions and depressions of smaller than 100 μm, sufficient durability (e.g., abrasion resistance, scratch resistance) may not be imparted to the transparent resin film of the present invention. In addition, the amount of the ultraviolet absorber contained in the depression of the pattern of protrusions and depressions is insufficient, leading to insufficient weather resistance. The thickness at the depression of the pattern of protrusions and depressions is preferably 105 μm or larger and 480 μm or smaller, more preferably 110 μm or larger and 300 μm or smaller.

The transparent resin film of the present invention contains an ultraviolet absorber in the depression of the pattern of protrusions and depressions.

The term "a depression of the pattern of protrusions and depressions" refers to the thinnest part of the transparent resin film of the present invention and a part including the deepest depression of the pattern of protrusions and depressions on the surface protective layer 11 as illustrated in FIG. 1. It can be confirmed by microscopic observation of a cross section of the transparent resin film of the present invention. The "thickness at a depression of the pattern of protrusions and depressions" is the length from the bottom of the deepest depression to the surface on the opposite side to the surface protective layer 11 side of the transparent resin layer 12.

The upper limit of the thickness at a depression of the pattern of protrusions and depressions of the transparent resin film is not limited, and may be, for example, smaller than 500 μm.

As illustrated in FIG. 1, the total thickness of the transparent resin film of the present invention is the length from the surface of the surface protective layer 11 to the surface on the opposite side to the surface protective layer 11 side of the transparent resin layer 12. The lower limit of the total thickness is preferably larger than 100 μm and the upper limit thereof is preferably 500 μm. The lower limit is more preferably 140 μm and the upper limit is more preferably 460 μm.

The transparent resin film of the present invention contains an ultraviolet absorber.

The ultraviolet absorber may be, for example, an organic or inorganic ultraviolet absorber. In particular, preferred is an organic ultraviolet absorber for its excellent transparency.

Examples of the organic ultraviolet absorber include: benzotriazole ultraviolet absorbers such as 2'-hydroxyphenyl-5-chlorobenzotriazole ultraviolet absorbers (e.g., 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-3'-tert-amyl-5'-methylphenyl)-5-chlorobenzotriazole, 2-(2'-hydroxy-3'-isobutyl-5'-methylphenyl)-5-chlorobenzotriazole, 2-(2'-hydroxy-3'-isobutyl-5'-propylphenyl)-5-chlorobenzotriazole) and 2'-hydroxyphenyl benzotriazole ultraviolet absorbers (e.g., 2-(2'-hydroxy-3',5'-di-tert-butylphenyl)benzotriazole, 2-(2'-hydroxy-5'-methylphenyl)benzotriazole); benzophenone ultraviolet absorbers such as 2,2'-dihydroxybenzophenone ultraviolet absorbers (e.g., 2,2'-dihydroxy-4-methoxybenzophenone, 2,2'-dihydroxy-4,4'-dimethoxybenzophenone, 2,2'-dihydroxy-4,4'-tetrahydroxybenzophenone) and 2-hydroxybenzophenone ultraviolet absorbers (e.g., 2-hydroxy-4-methoxybenzophenone, 2,4-dihydroxybenzophenone); and salicylic acid ester ultraviolet absorbers such as phenyl salicylate and 4-t-butyl-phenyl-salicylate.

In particular, preferred are triazine ultraviolet absorbers from the standpoint of favorably imparting the weather resistance, design properties, and bleed resistance.

Examples of the triazine ultraviolet absorbers include 2,4-bis(2,4-dimethylphenyl)-6-(2-hydroxy-4-n-octyloxyphenyl)-1,3,5-triazine, 2-(2,4-dihydroxyphenyl)-4,6-bis(2,4-dimethylphenyl)-1,3,5-triazine, 2-(2,4-dihydroxyphenyl)-4,6-diphenyl-1,3,5-triazine, 4,4',4"-(1,3,5-triazine-2,4,6-triyltriimino)trisbenzoic acid tris(2-ethylhexyl)ester, 2-(2-hydroxy-4-methoxyphenyl)-4,6-diphenyl-1,3,5-triazine, N,N',N"-tri(m-tolyl)-1,3,5-triazine-2,4,6-triamine, 2,4,6-tris(4-butoxy-2-hydroxyphenyl)-1,3,5-triazine, and 2-(4,6-diphenyl-1,3,5-triazine-2-yl)-5-[2-(2-ethylhexanoyloxy)ethoxy]phenol.

Also usable is a reactive ultraviolet absorber in which an acryloyl or methacryloyl group is introduced into a benzotriazole skeleton. In the case where the required transparency is not high, an inorganic ultraviolet absorber may be added. Examples of the inorganic ultraviolet absorber include titanium oxide, cerium oxide, and iron oxide having a particle size of 0.2 μm or smaller.

The amount of the ultraviolet absorber is appropriately determined according to the UV absorption capacity of the ultraviolet absorber used.

In the case where the transparent resin layer contains a triazine ultraviolet absorber as the ultraviolet absorber, for example, the amount of the ultraviolet absorber in the transparent resin layer is preferably 1% by mass or more and 10% by mass or less.

When the amount in the transparent resin layer is less than 1% by mass, the weather resistance imparted may be insufficient. When the amount in the transparent resin layer is more than 10% by mass, the film has lower transparency to lower the design properties when formed into a decorative board or the adhesion between the transparent resin film of the present invention and a picture layer described later may be insufficient to lower the processability of the transparent resin film of the present invention.

The lower limit of the amount of the ultraviolet absorber is more preferably 2% by mass and the upper limit thereof is more preferably 7% by mass.

For achieving remarkably excellent weather resistance, the transparent rein film of the present invention preferably contains the ultraviolet absorber in at least one of the surface protective layer or the transparent resin layer.

Here, a conventional transparent resin film containing an ultraviolet absorber in the layer having a pattern of protrusions and depressions disadvantageously has a part where the amount of the ultraviolet absorber is small due to thickness variations, resulting in the presence of a part where the weather resistance is insufficient. In contrast, having a predetermined thickness at a depression of the pattern of protrusions and depressions as described above and containing a sufficient amount of an ultraviolet absorber even at a depression of the pattern of protrusions and depressions, the transparent resin film of the present invention can have high weather resistance.

In the case where the primer layer described above is provided between the transparent resin layer and the surface protective layer, the primer layer may contain an ultraviolet absorber.

As illustrated in FIG. 2, the transparent resin film of the present invention preferably includes the adhesion primer layer 13 on the surface on the opposite side to the surface protective layer 11 side of the transparent resin layer 12.

The adhesion primer layer is provided for the purpose of further increasing the adhesion strength to a picture layer described later.

The adhesion primer layer preferably contains a binder resin.

Examples of the binder resin include urethane resins, acrylic resins, acrylic-urethane resins, acrylic-urethane copolymer resins, cellulosic resins, polyester resins, and vinyl chloride-vinyl acetate copolymer resins. In the case where the ionizing radiation-curable resin composition for the surface protective layer described above contains a urethane acrylate oligomer, the binder resin is preferably a urethane resin from the standpoint of the adhesion to the surface protective layer and the production efficiency.

The adhesion primer layer preferably has a thickness of 0.5 μm or larger and 10 μm or smaller. When the thickness of the adhesion primer layer is 0.5 μm or larger, the adhesion between the transparent resin film of the present invention and a substrate on which a picture layer described later is laminated is favorably ensured. When the thickness of the adhesion primer layer is 10 μm or smaller, the transparent resin film of the present invention is not too thick and can have sufficient transparency. Thus, the design properties of the decorative board can be favorably ensured.

The adhesion primer layer more preferably has a thickness of 0.8 μm or larger and 6 μm or smaller.

The adhesion primer layer may contain inorganic fine particles such as silica particles.

In the present invention, the transparent resin layer may be subjected to surface treatment such as saponification treatment, glow discharge treatment, corona discharge treatment, plasma treatment, ultraviolet (UV) treatment, or flame treatment, within a range of the gist of the present invention.

The transparent resin film of the present invention is used to protect the picture layer and has a pattern of protrusions and depressions on the surface, and therefore is also capable of imparting excellent design properties to a decorative board including the transparent resin film of the present invention.

The present invention also encompasses such a decorative board including a substrate, a picture layer, and the transparent resin film of the present invention, in the stated order in the thickness direction.

Figure 3:
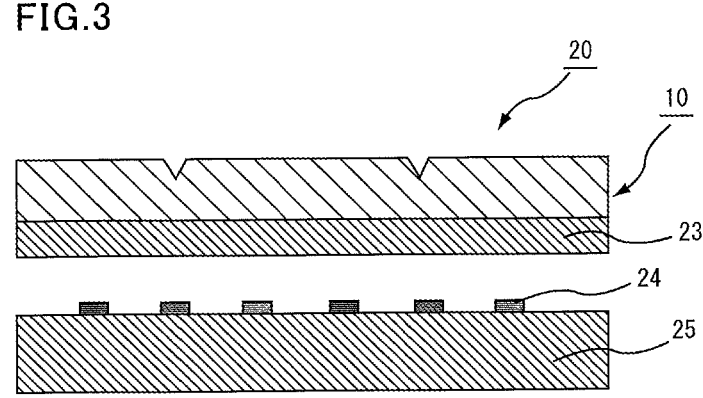
FIG. 3 is a schematic view illustrating a cross section of a preferred example of the decorative board of the present invention.

A preferred example of the decorative board of the present invention is described with reference to FIG. 3.

In a decorative board 20 of the present invention, a picture layer 24 is laminated on one surface of a substrate 25, and a transparent resin film 10 of the present invention is laminated on the opposite side to the substrate 25 side of the picture layer 24.

From the standpoint of further increasing the adhesion strength between the picture layer 24 and the transparent resin film 10 of the present invention, an adhesive layer 23 is preferably provided.

The components of the decorative board of the present invention are described hereinbelow.

The substrate is not limited and is appropriately determined, for example, according to the application of the decorative board including the transparent resin film of the present invention.

The substrate may be made of any known material such as a resin material, a wood material, or a metal material. In particular, the material of the substrate is preferably a resin material or a wood material for its rigidity and lightness. The material may also be a composite material of these.

The resin material preferably contains, for example, a thermoplastic resin.

Preferred examples of the thermoplastic resin include: polyvinyl resins such as polyvinyl chloride resins, polyvinyl acetate resins, and polyvinyl alcohol resins; polyolefin resins such as polyethylene, polypropylene, polystyrene, ethylene-vinyl acetate copolymer resins (EVA), and ethylene-(meth)acrylic acid resins; polyester resins such as polyethylene terephthalate resins (PET resins); homopolymers and copolymers of thermoplastic resins such as acrylic resins, polycarbonate resins, polyurethane resins, acrylonitrile-butadiene-styrene copolymer resins (ABS resins), and acrylonitrile-styrene copolymer resins; and resin mixtures of these. In particular, preferred are polyolefin resins, acrylonitrile-butadiene-styrene copolymer resins, polyvinyl chloride resins, and ionomers.

The resin material may be foamed.

Examples of the wood material include various materials such as cedar, cypress, zelkova, pine, lauan, teak, and Melapi. The core may be any of sliced veneers, single panels, plywood panels (including LVL), particle boards, medium-density fiberboards (MDF), high-density fiberboards (HDF), and bonded wood made from the above materials and laminated materials prepared by appropriately laminating these.

Examples of the metal material include iron.

The substrate may contain an inorganic compound.

In the case where the substrate is formed of multiple resin substrates, the types of the resins forming the multiple resin substrates may be the same or different, and the thicknesses of the multiple resin substrates may be the same or different.

In the present invention, the substrate may have a hollow structure or partially have a slit or a through hole.

The substrate may have any thickness. The thickness is preferably, for example, 0.01 mm or larger, more preferably 0.1 mm or larger and 50 mm or smaller.

The substrate may have a substantially plate shape other than the flat plate shape, such as those including a pattern of protrusions and depressions or a curved surface.

A picture layer is laminated on one side of the substrate.

The picture layer is a layer for imparting decorativeness to the decorative board of the present invention including the transparent resin film of the present invention. The picture layer may be, for example, a uniformly colored hiding layer (solid print layer), a design layer formed by printing various patterns using ink and a printer, or a layer combining a hiding layer and a design layer (hereafter, referred to as a pattern layer).

The hiding layer can add an intended color to the substrate which may be stained or colored unevenly, thereby adjusting the color of the surface.

The design layer can provide the decorative board with various patterns such as wood-grain patterns, stone grain patterns imitating the surface of a rock such as marble patterns (e.g., pattern of travertine marble), fabric patterns imitating fabric texture or fabric-like patterns, tiled patterns, brick-masonry patterns, and parquet or patchwork patterns which are combinations of the above patterns. These patterns are formed by typical polychromic printing in process colors including yellow, red, blue, and black, or polychromic printing in spot colors in which plates of individual colors constituting the pattern are used.

The ink composition used for the picture layer is a composition prepared by appropriately mixing a binder resin with a colorant such as a pigment and a dye, an extender pigment, a solvent, a stabilizer, a plasticizer, a catalyst, a curing agent, and the like. Any binder resin may be used. Preferred examples thereof include urethane resins, acrylic resins, urethane-acrylic resins, urethane-acrylic copolymer resins, vinyl chloride/vinyl acetate copolymer resins, vinyl chloride/vinyl acetate/acrylic copolymer resins, polyester resins, and nitrocellulose resins. Any of these binder resins may be used alone or in combination of two or more.

Preferred examples of the colorant include: inorganic pigments such as carbon black (Chinese ink), iron black, titanium white, antimony white, chrome yellow, titanium yellow, red iron oxide, cadmium red, ultramarine, and cobalt blue; organic pigments or dyes such as quinacridone red, iso-indolinone yellow, and phthalocyanine blue; metal pigments formed of foil flakes of aluminum, brass, and the like; and pearl-like luster pigments (pearl pigments) formed of foil flakes of titanium dioxide-coated mica, basic lead carbonate, and the like.

The picture layer may have any thickness. The thickness is preferably 0.1 µm or larger, more preferably 0.5 µm or larger and 600 µm or smaller. Having a thickness within the range indicated above, the picture layer can impart an excellent design to the decorative board of the present invention and also can have hiding properties.

In the case where the substrate itself has design properties, such as the case of using sliced veneers, a picture layer may not be provided.

The decorative board of the present invention may have any thickness. The thickness is preferably, for example, 0.05 mm or larger, more preferably 1 mm or larger and 50 mm or smaller.

The decorative board of the present invention preferably includes an adhesive layer between the picture layer and the transparent resin film of the present invention.

The adhesive layer is a layer provided between the picture layer and the substrate of the transparent resin film of the present invention. The adhesive layer can further increase the adhesion strength between the picture layer and the transparent resin film of the present invention.

The adhesive layer preferably contains a binder resin. Examples of the binder rein contained in the adhesive layer is favorably the binder resin used for the adhesion primer layer described above.

The adhesive layer may be bonded by any method such as heat melting, thermal lamination, or lamination using a water-based adhesive, a thermosensitive adhesive, a pressure-sensitive adhesive, or a hot-melt adhesive.

The decorative board of the present invention may be produced by lamination of the substrate, the picture layer, and the transparent resin film using, for example, an adhesive forming the adhesive layer described above.

In particular, the method for producing the decorative board preferably includes: forming an adhesive layer on the picture layer side surface of the transparent resin film; and bonding the transparent resin film and the picture layer with the adhesive layer.

The present invention also encompasses such a method for producing the decorative board of the present invention.

In the case of the transparent resin film, the pattern of protrusions and depressions is formed on the surface protective layer side by embossing or the like. At this time, a bit of a pattern of protrusions and depressions corresponding to the pattern of protrusions and depressions on the embossed side is unintendedly formed on the surface on the opposite side (picture layer side) to the surface subjected to embossing. In such a case, air entrainment, i.e., a phenomenon that air enters into the pattern of protrusions and depressions on the picture layer side of the transparent resin film, may occur to lower the design properties.

Since the method for producing the decorative board of the present invention includes a step of forming an adhesive layer on the picture layer side surface of the transparent resin film, the adhesive layer is provided even at a depression of the pattern of protrusions and depressions on the picture layer side, the air entrainment can be prevented, thereby suppressing impairment of the design properties.

EXAMPLES

The present invention is more specifically described with reference to, but not limited to, examples hereinbelow.

Example 1

To one surface of a transparent polypropylene film (thickness of 60 µm) containing 5% by mass of a triazine ultraviolet absorber (product name: ADK STAB LA-46, available from ADEKA Corporation) was applied an adhesion primer agent that was a two-component curable urethane resin containing isocyanate as a curing agent. Thus, an adhesion primer layer having a thickness of 2 µm was obtained.

To the other surface of the transparent polypropylene film (surface on the opposite side to the adhesion primer layer side) was melt-extruded and thermal laminated a transparent polypropylene resin (thickness of 80 µm) containing 5% by mass of a triazine ultraviolet absorber (product name: ADK STAB LA-46, available from ADEKA Corporation).

The surface was subjected to corona treatment. Then, to the surface was applied a primer layer that was a two-component curable urethane resin containing isocyanate as a curing agent to a thickness of 2 μm.

To the surface of the primer layer was applied by gravure coating a urethane (meth)acrylate that was an ionizing radiation-curable resin containing 5% by mass of a triazine ultraviolet absorber (product name: ADK STAB LA-46, available from ADEKA Corporation) to a thickness of 15 μm. The applied resin was irradiated with an electron beam at an accelerating voltage of 165 keV and 5 Mrad, thereby forming a surface protective layer.

After heating of the surface protective layer side with a contactless infrared heater, the obtained film was directly subjected to thermal pressure embossing, thereby forming a pattern of protrusions and depressions. Thus, a transparent resin film was provided. The obtained transparent resin film had a total thickness of 157 μm and a thickness at a depression of the pattern of protrusions and depressions of 105 μm.

Separately, a high-density fiberboard (HDF) (thickness of 3 mm) was provided. On one surface of the HDF was formed a picture layer having a thickness of 2 μm using an inkjet printer. Thus, a substrate was provided.

To the surface on the adhesion primer layer side of the obtained transparent resin film was applied a two-component curable polyester resin (thickness of 30 μm) containing isocyanate as a curing agent. The obtained transparent resin film and the substrate were laminated in a manner that the adhesion primer layer side of the transparent resin film was in contact with the picture layer side of the substrate. Thus, a decorative board was obtained. Then, the decorative board was allowed to stand in a room-temperature environment under a pressure of 10 kg/m² for three days.

Example 2

A transparent resin film was produced as in Example 1, except that to the other surface (surface on the opposite side to the adhesion primer layer side) of the transparent polypropylene film was melt-extruded and thermal laminated a transparent polypropylene resin (thickness of 100 μm) containing 5% by mass of a triazine ultraviolet absorber (product name: ADK STAB LA-46, available from ADEKA Corporation) and the pattern of protrusions and depressions formed was controlled as shown in Table 1. Then, a decorative board was produced.

Example 3

A transparent resin film was produced as in Example 1, except that to the other surface (surface on the opposite side to the adhesion primer side) of the transparent polypropylene film was melt-extruded and thermal laminated a transparent polypropylene resin (thickness of 200 μm) containing 5% by mass of a triazine ultraviolet absorber (product name: ADK STAB LA-46, available from ADEKA Corporation) and the pattern of protrusions and depressions formed was controlled as shown in Table 1. Then, a decorative board was produced.

Example 4

A transparent resin film was produced as in Example 1, except that to a transparent polypropylene film (thickness of 80 μm) containing 5% by mass of a triazine ultraviolet absorber (product name: ADK STAB LA-46, available from ADEKA Corporation) was melt-extruded and thermal laminated a transparent polypropylene resin (thickness of 400 μm) containing 5% by mass of a triazine ultraviolet absorber (product name: ADK STAB LA-46, available from ADEKA Corporation) and the pattern of protrusions and depressions formed was controlled as shown in Table 1. Then, a decorative board was produced.

Example 5

A transparent resin film was produced as in Example 1, except that a transparent polypropylene film (thickness of 60 μm) not containing any ultraviolet absorber and a transparent polypropylene resin (thickness of 80 μm) containing 5% by mass of a triazine ultraviolet absorber (product name: ADK STAB LA-46, available from ADEKA Corporation) were used and the pattern of protrusions and depressions formed was controlled as shown in Table 1. Then, a decorative board was produced.

Example 6

A transparent resin film was produced as in Example 1, except that the ultraviolet absorber contained in the transparent polypropylene film (thickness of 60 μm) and the transparent polypropylene resin (thickness of 80 μm) was changed to a benzotriazole ultraviolet absorber (product name: ADK STAB LA-36, available from ADEKA Corporation). Then, a decorative board was produced.

Comparative Example 1

A transparent resin film was produced as in Example 1, except that a transparent polypropylene film (thickness of 60 μm) containing 5% by mass of a triazine ultraviolet absorber (product name: ADK STAB LA-46, available from ADEKA Corporation) and a transparent polypropylene resin (thickness of 60 μm) containing 5% by mass of a triazine ultraviolet absorber (product name: ADK STAB LA-46, available from ADEKA Corporation) were used and the pattern of protrusions and depressions was formed in a manner that the transparent resin film had a thickness at a depression of the pattern of protrusions and depressions of 90 μm. Then, a decorative board was produced.

<Design Properties>

The printed patterns of the decorative boards obtained in the examples and the comparative example were visually checked and evaluated according to the following criteria. Table 1 shows the results.
 +++: The printed pattern was clearly visible.
 ++: The printed pattern was blurred slightly.
 +: The printed pattern turned yellow slightly.
 −: The printed pattern was not clearly visible.

<Color Difference after Weather Resistance Test>

The decorative boards obtained in the examples and the comparative example were put in a super accelerated weathering tester (EYE Super UV Tester available from Iwasaki Electric Co., Ltd.) set at conditions mentioned below, and taken out after 17 cycle operation in which one cycle includes 20-hour irradiation and 4-hour dew condensation.

(Accelerated Test Condition)
 Black panel temperature: 63° C.
 Humidity: 50% RH
 Irradiation intensity: 60 W/m² (365 nm)

The color difference of each decorative board before and after the accelerated test was measured with a color difference meter (CR-300 available from Minolta Co., ltd.). Specifically, the L-value, a-value, and b-value of the decorative board were measured before and after the accelerated test, and the color difference ΔE was calculated using the following equation 1. Table 1 shows the results.

$$\Delta E=[(\Delta L)^2+(\Delta a)^2+(\Delta b)^2]^{1/2} \quad \text{Equation 1}$$

++: ΔE<1.0
+: 1.0≤ΔE<1.5
−: 1.0≤ΔE<1.5

ΔL=|L-value(after weather resistance test)−L-value (before weather resistance test)|

Δa=|a-value(after weather resistance test)−a-value (before weather resistance test)|

Δb=|a-value(after weather resistance test)−a-value (before weather resistance test)|

<Abrasion Resistance (Taber Abrasion Test)>

For the decorative boards obtained in the examples and the comparative example, a test was performed under a load of 1 kg using a Taber abrasion tester (available from Rigaku Kogyo Co., Ltd.) and an abrasion paper (S-42) in conformity with Abrasion A test of Japanese Agricultural Standards for flooring. Evaluation was performed on the pattern of the picture layer remaining after 1500 rotations. Table 1 shows the results.

+++: The whole picture layer remained.
++: 80% or more of the picture layer remained.
+: 50% or more but less than 80% of the picture layer remained.
−: Less than 50% of the picture layer remained.

TABLE 1

| Item | Unit | Example 1 | Example 2 | Example 3 | Example 4 | Example 5 | Comparative Example 1 | Example 6 |
|---|---|---|---|---|---|---|---|---|
| Thickness at depression of pattern of protrusions and depressions | μm | 105 | 125 | 200 | 450 | 105 | 90 | 105 |
| Total thickness of transparent resin film | μm | 157 | 177 | 272 | 497 | 157 | 137 | 157 |
| Type of ultraviolet absorber | | Triazine | Triazine | Triazine | Triazine | Triazine | Triazine | Benzotriazole |
| Design properties (visual check) | | +++ | +++ | +++ | ++ | +++ | +++ | + |
| Color difference after weather resistance test | ΔE | + | ++ | ++ | ++ | + | − | ++ |
| Abrasion resistance (loss of pattern) | | + | ++ | +++ | +++ | + | − | + |

INDUSTRIAL APPLICABILITY

The present invention can provide a transparent resin film that is capable of imparting excellent design properties to a decorative board and is excellent in weather resistance. For excellent design properties and excellent weather resistance, the decorative board of the present invention is favorably used for building materials such as fittings, doors (e.g., sliding doors), floor materials, wall materials, and ceiling materials, and various decorative molded articles.

REFERENCE SIGNS LIST

10: transparent resin film
11: surface protective layer
12: transparent resin layer
13: adhesion primer layer
20: decorative board
23: adhesive layer
24: picture layer
25: substrate

The invention claimed is:

1. A decorative board comprising:
a substrate;
a picture layer;
an adhesive layer; and
a transparent resin film in an order in a thickness direction as stated below,
the transparent resin film for protecting the picture layer laminated on one side of the substrate, comprising at least:
a surface protective layer;
a transparent resin layer, and
an adhesion primer layer on a side opposite to the surface protective layer side of the transparent resin layer, wherein
the transparent resin film having a pattern of protrusions and depressions on the surface protective layer side and on the picture layer side,
the transparent resin film having a thickness at a depression of the pattern of protrusions and depressions of 140 μm or larger,
the transparent resin film containing an ultraviolet absorber,
the surface protective layer containing an oligomer having a radical polymerizable unsaturated group in the molecule, and
the picture layer does not have a pattern of protrusions and depressions synchronized to the pattern of protrusions and depressions of the picture layer side of the transparent resin film.

2. The decorative board according to claim 1, wherein the ultraviolet absorber is contained in at least one of the surface protective layer or the transparent resin layer.

3. The decorative board according to claim 1, wherein the adhesion primer layer has a thickness of 0.5 μm or larger and 10 μm or smaller.

4. The decorative board according to claim 1, wherein the ultraviolet absorber is a triazine ultraviolet absorber.

5. A method for producing the decorative board according to claim 1, the method comprising:
forming an adhesive layer on a picture layer side surface of a transparent resin film; and
bonding the transparent resin film and the picture layer with the adhesive layer.

6. The decorative board according to claim 2, wherein the ultraviolet absorber is a triazine ultraviolet absorber.

7. The decorative board according to claim 3, wherein the ultraviolet absorber is a triazine ultraviolet absorber.

8. A method for producing the decorative board according to claim 2, the method comprising:
forming an adhesive layer on a picture layer side surface of a transparent resin film; and
bonding the transparent resin film and the picture layer with the adhesive layer.

* * * * *